Jan. 3, 1933.  E. C. IVERSON  1,893,235

NAVIGATIONAL INSTRUMENT

Filed March 11, 1931  2 Sheets-Sheet 1

ERLING C. IVERSON
INVENTOR

BY *Robert A. Lavender*
ATTORNEY

Jan. 3, 1933.   E. C. IVERSON   1,893,235
NAVIGATIONAL INSTRUMENT
Filed March 11, 1931   2 Sheets-Sheet 2

ERLING C. IVERSON
INVENTOR

BY
ATTORNEY

Patented Jan. 3, 1933

1,893,235

UNITED STATES PATENT OFFICE

ERLING C. IVERSON, OF PORT ARTHUR, TEXAS

NAVIGATIONAL INSTRUMENT

Application filed March 11, 1931. Serial No. 521,854.

My invention relates to improvements in navigational instruments, and the objects of my improvement are first, to provide a method for quick and reasonably exact direct conversion of time, from Greenwich civil time to local sidereal time.

A second object of my invention is to provide a method for quick and reasonably exact direct conversion of time, from Greenwich civil time to local apparent time.

A third object of my invention is to afford rapid ascertainment of hour angles and meridian passages.

A fourth object of my invention is to furnish the correction to be applied to the true altitude of Polaris to obtain observer's latitude.

A fifth object of my invention is to supply approximate information for the rapid calculation of azimuth and altitude of the principal navigational stars, whereby they may be identified.

A further object of my invention is to provide an improved simple, durable, convenient and inexpensive apparatus for the practice of my method.

I attain these objects by the instrument illustrated in the accompanying drawings, in which Fig. 1 is a plan view of the instrument assembled;

Similar numerals refer to similar parts throughout the several views.

The instrument consists essentially of a central disk about which are four concentric rings, which are so joined that the whole constitutes one unit. Two rings are semi-permanently secured together and the others are slidably adjustable throughout their entire circumference.

Figure 1:
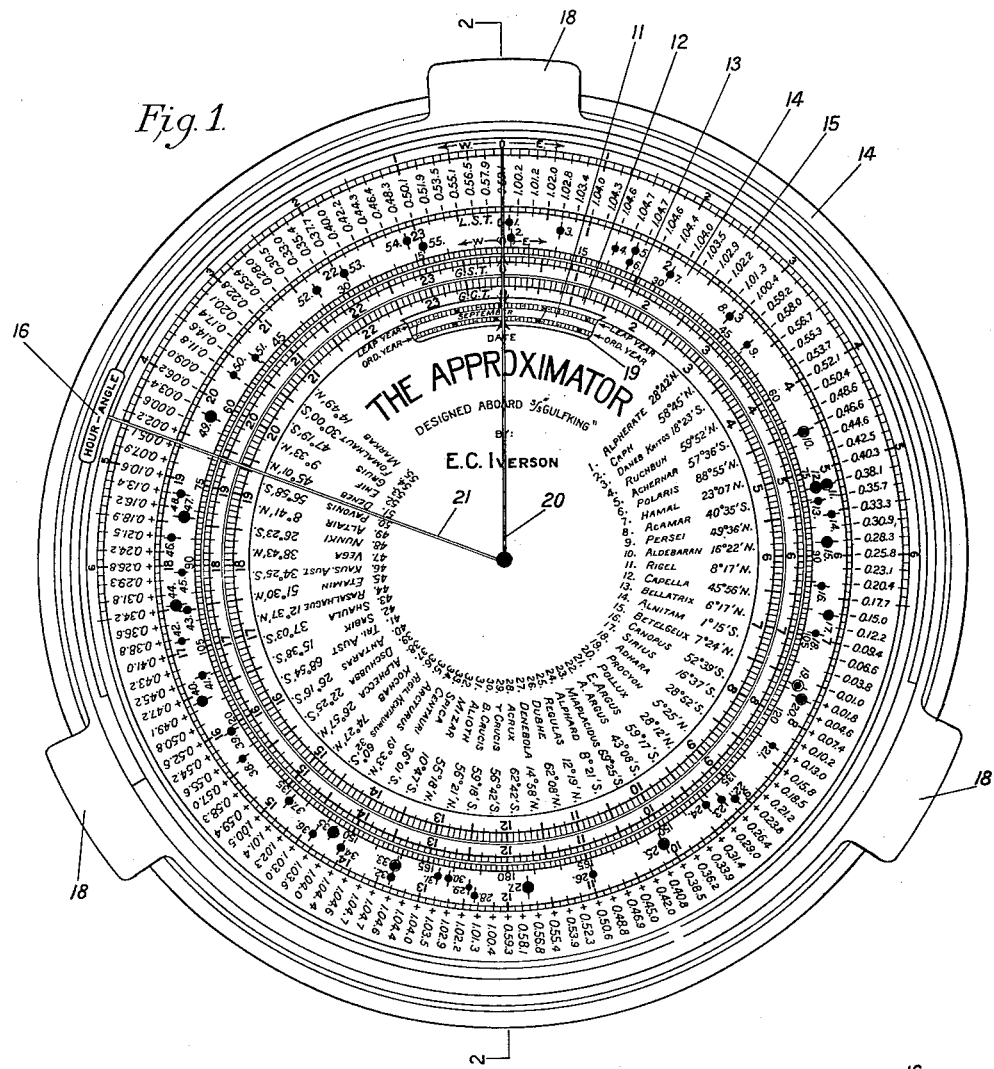
Figure 2:
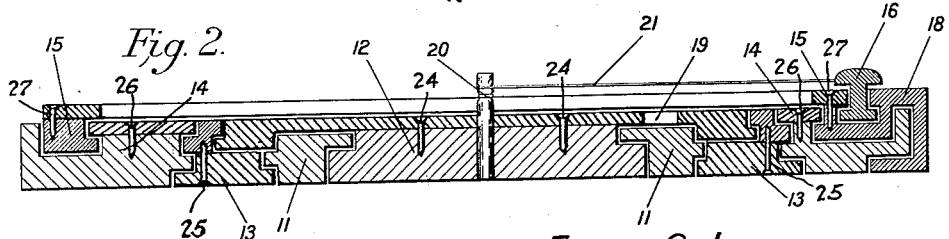
Fig. 2 is a section at 2—2, with the right end showing the operation of the hour angle arm, enlarged for clearness.
Figure 3:
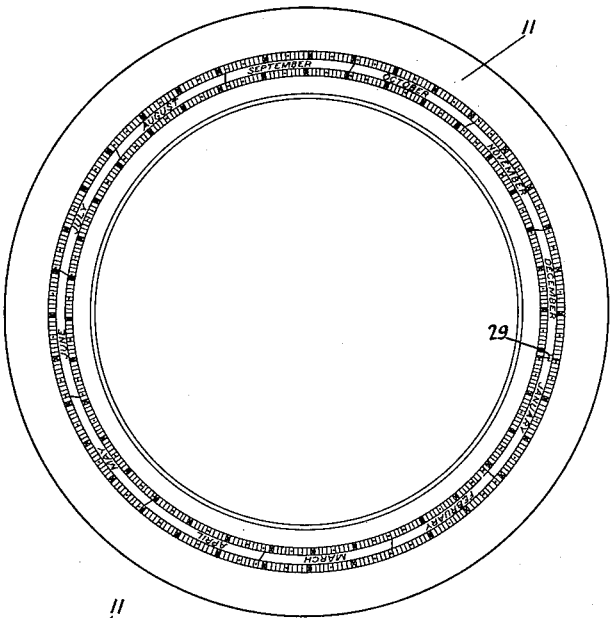
Fig. 3 shows a plan view of ring 11.

Ring 11, Figs. 1, 2 and 3, has two concentric circles graduated into 366 parts, 365 of these being equal and the remaining one, between December 31 and January 1, being one-fourth the size of the others. Three hundred sixty-five and one-fourth is the approximate number of civil days required for sidereal time to gain 24 hours on civil time. The manner of correcting for the one-fourth day will be explained in connection with Fig. 4. The inner graduated circle is dated as an ordinary year and the outer one as a leap year.

Disk 12, Figs. 1 and 2, is divided into 24 hours and divisions thereof, representing Greenwich civil time. An opening is cut in disk 12 at 19, directly below zero hour Greenwich civil time, to expose a portion of the scales on ring 11, in order that "zero hour" Greenwich civil time can be set on the proper date. On December 31 of any leap year, zero hour is set on the right arm of the bracket 29 between the two date scales. In the central portion the principal navigational sttars are listed, giving their mean declinations and numbers as shown in the American Nautical Almanac. The numbers are used to identify stars indicated on ring 14.

Figure 4:
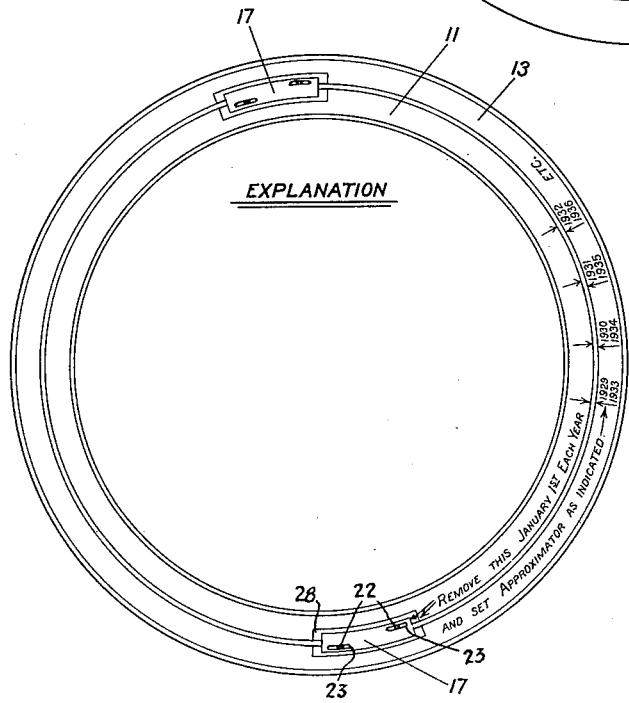
Fig. 4 shows a plan view of the central portion of the back of the instrument.

Ring 13, Figs. 1, 2 and 4, is divided into 24 hours and divisions thereof, representing Greenwich sidereal time. This ring is secured semi-permanently to ring 11 in such a manner that a radius passing through a particular date graduation on the scales on ring 11 will point out, on the scale on ring 13, the sidereal time of zero hour Greenwich civil time for that date. The relation between Greenwich civil time and Greenwich sidereal time requires a small adjustment on January 1st of each year. The division equal to one-fourth day being between December 31 and January 1, the advance of disk 12 clockwise relative to ring 13 between those two dates would be equal to one and one-fourth days, when it should be but one day. To correct this, ring 13 is moved clockwise relative to disk 12 and ring 11 an amount equal to that one-fourth day. Leap year having 366 days, December 31 of that year is set on the right-hand arm of bracket 29, the distance between the two arms of the bracket being equal to one day. Then, on January 1 of the year following leap year, the advance of disk 12 clockwise relative to ring 13 will be only one-fourth day, and to get the other three-fourths day advance, ring 13 is moved that amount counter-clockwise relative to disk 12 and ring 11 to begin a new cycle of four years. No attempt is made to correct G. S. T. or L. S. T. for the difference in time between zero hours G. C. T. and the G. C. T. involved in a particular problem. Such a refinement is not necessary for the purposes for which the instrument is used.

The means for making this adjustment are shown in Fig. 4. The arrow point on ring 11 must be set opposite its corresponding arrow point on ring 13 for the current year. The correction goes through the same cycle every four years ending with a leap year. The securing strips 17 have enough clearance from the edges of the elongated depression 28 in rings 11 and 13 to allow for correction over the entire cycle. When the screws 22 passing through base 17 and into rings 11 and 13 respectively are loosened, the slots 23 allow sufficient relative movement between rings 11 and 13 to make the adjustment and the screws 22 can then be re-tightened.

Ring 14, Figs. 1 and 2, has two graduated scales. The inner scale is divided into 360 degrees and marked from 0° to 180° in opposite directions to represent longitude, east longitude being clockwise and west longitude counter-clockwise from zero. The outer scale is divided into 24 hours, and divisions thereof, representing local sidereal time. The zeros on the inner and outer scales are on the same radius.

Outside the L. S. T. scale are shown the corrections to be applied to the true altitude of Polaris to give the boserver's latitude. It is given for each 10 minutes of the L. S. T. As these corrections are changed annually, they are indicated on a ring semi-permanently secured to ring 14. In addition, on ring 14 between the longitude scale and the L. S. T. scale, or preferably outside the polaris corrections, the principal navigational stars are indicated, being on radii of the L. S. T. scale that correspond to their respective right ascensions. Their magnitudes are indicated by their sizes.

Disk 12 with its encircling rings 11, 13 and 14 are contained in circular frame 15 which has supporting lugs or pieces 18, or they may be contained in any frame capable of receiving them and in which they may revolve freely.

On the inner circumference of frame 15 is a scale graduated in hours and divisions thereof, going from zero to a suitable number of hours preferably six and one-half hours east and west. An indicator 20 is connected between zero hour on this scale and the center of the instrument. This serves as a local meridian and assists in reading the various scales. Another indicator 21 is connected between part 16 and the center of the instrument. Part 16 slides in an arcuate groove so that indicator 21 can be set on a particular star and indicate, on the scale on frame 15, its hour angle east or west of the local meridian. When the stars are plotted from the outer extremity of ring 14, indicator 21 may be dispensed with as each star registers separately with the scale on frame 15.

The relation between rings 11 and 13 having been fixed as explained above, it is clear that when zero hour, disk 12, is placed on the proper date on ring 11, the relation between Greenwich civil time and Greenwich sidereal time is correct. Now if zero hour Greenwich sidereal time is placed on a particular longitude, without relative movement between disk 12 and rings 11 and 13, then for that longitude the relation between Greenwich civil time, Greenwich sidereal time and local sidereal time as shown on the instrument is correct. Again if disk 12 with rings 11, 13 and 14 are rotated in frame 15, without relative motion between themselves, until indicator 20 passes through the Greenwich civil time of observation, then indicator 20 will also show the Greenwich sidereal time and local sidereal time of observation, show the principal navigational stars near the meridian, and point out the correction to apply to the true altitude of Polaris to obtain the latitude. The time before or after meridian passage can then be measured by hour angle indicator 21.

The information taken from a particular set-up can be used for the rapid calculation of altitudes and azimuths and hence the identification of stars.

Another use of the instrument is for conversion from standard time to local apparent time. Consider the Greenwich civil time scale as standard time; adjust Greenwich sidereal time scale, ring 13, to compensate for the equation of time; set zero hours Greenwich sidereal time on the longitude scale, to compensate for the degrees of longitude away from the standard meridian; and the indicator 20 will point out on the local sidereal time scale the local apparent time corresponding to the standard time.

In the construction of the instrument the central disk and the various encircling rings are held in slidable engagement with each other by tongues and grooves. In order to permit the assembling of the various pieces, the disk 12 is made in two parts held together by screws 24; the ring 13 is made in two parts held together by screws 25; the ring 14 is made in two parts held together by screws 26; and the frame 15 is made in two parts held together by screws 27. With this explanation of the construction it is believed that the assembling of the instrument will be clear to anyone possessing ordinary mechanical skill.

An example will now be worked to explain the above use of the instrument.

On June 14, 1930 in latitude 30 north and longitude 63 west it is desired to determine the stars that may be available for evening observation at 8:00 p. m. 60th meridian time, which is zero hours G. C. T. on June 15. First place G. C. T. zero hours (disk 12) on the date June 15 (ring 11), then place G. S. T. zero hours (ring 13) on longitude 63 west (ring 14) maintaining the set relation between disk 12 and rings 11 and 13. With this adjustment of the instrument the relation between G. C. T., G. S. T. and L. S. T. is established so that for any particular G. C. T. the corresponding L. S. T. on ring 14 is on the same radius, and if this particular L. S. T. is equal to the right ascension of any star, that star will be found on the same radius and will be on the local meridian at that time. Our particular G. C. T. for this problem is zero hours, therefore, we move disk 12 and rings 11, 13 and 14 within frame 15 until G. C. T. zero hours is in line with zero hours on the scale on frame 15 and we see that Spica will cross the meridian (indicator 20) at G. C. T. zero hours and 3 minutes. In the west we have the Denebola with an hour angle of 1 hour and 43 minutes, Regulus with an hour angle of 3 hours and 14 minutes and Procyon with an hour angle of 5 hours and 43 minutes, and in the east we have Antares with an hour angle of 3 hours and 7 minutes, Rasalhague with an hour angle of 4 hours and 14 minutes, and Vega with an hour angle of 5 hours and 16 minutes; and all the other navigational stars that will be visible at that time may be seen at a glance. With these hour angles and the declinations taken from the face of disk 12 the azimuths and altitudes can readily be determined by H. O. Publication 203. The navigator can then set his sextant on the approximate altitude and, by observing on the proper azimuth, pick up the stars with ease.

The exact manipulation of the instrument to solve the other problems mentioned in the specification will be apparent to those skilled in the art, in view of the description given in connection with the problem solved in detail above.

It will be apparent that my invention furnishes a very valuable instrument for the use of the navigator at sea.

The invention herein described may be manufactured and used by or for the Government of the United States for governmental purposes without the payment to me of any royalties thereon or therefor.

Having now so fully described my invention that others skilled in the art may make and use the same therefrom, what I claim and desire to secure by Letters Patent is:

1. A navigation instrument consisting of; a central disk, said disk having on its circumference a graduated scale of 24 hours and subdivisions thereof, for indicating Greenwich civil time, a ring rotatably mounted and encircling a portion of said disk, but not extending to its outermost periphery, and having on its circumference two graduated date scales, said scales being divided into 366 parts, 365 of which are equal, the 366th part being one-fourth the size of one of the others, one of said scales being dated as an ordinary year and the other of said scales being dated as a leap year, a portion of said scales being visible through an opening near the circumference of said disk, for setting zero hour Greenwich civil time on the Greenwich civil date, a second ring rotatably mounted and encircling said first ring and said disk and having on its circumference a graduated scale of 24 hours and subdivisions thereof, for indicating Greenwich sidereal time, said first and second rings being semi-permanently secured together, a third ring rotatably mounted and encircling said second ring and having on its inner circumference a scale graduated into degrees from zero to 180 in opposite directions, for indicating longitude east and west, having on a greater circumference a second scale of 24 hours and subdivisions thereof, for indicating local sidereal time, the zeros of said scales on said third ring being on the same radius, and an indicator rotatably mounted at the center of said instrument and extending beyond the outer scale, for setting on the Greenwich civil time of observation and indicating the corresponding Greenwich sidereal time and local sidereal time.

2. A navigation instrument consisting of; a central disk, said disk having on its circumference a graduated scale of 24 hours and subdivisions thereof, for indicating Greenwich civil time, a ring rotatably mounted and encircling a portion of said disk, but not extending to its outermost periphery, and having on its circumference two graduated date scales, said scales being divided into 366 parts, 365 of which are equal, the 366th part being one-fourth the size of one of the other parts, one of said scales being dated as an ordinary year and the other of said scales being dated as a leap year, a portion of said scales being visible through an opening near the circumference of said disk, for setting zero hour Greenwich civil time on the Greenwich civil date, a second ring rotatably mounted and encircling said first ring and said disk and having on its circumference a graduated scale of 24 hours and subdivisions thereof, for indicating Greenwich sidereal time, said first and second rings being semi-permanently secured together, a third ring rotatably mounted and encircling said second ring and having on its inner circumference a scale graduated into degrees, from zero to 180 in opposite directions, for indicating longitude east and west, a second scale on the said third ring graduated in hours to 24 and subdivisions thereof, for indicating local sidereal time, the zeros of said scales on said third ring being on the same radius, and having plotted between the above mentioned two scales on said third ring the principal navigational stars according to their respective right ascensions as measured on the local sidereal time scale, a frame rotatably mounted and encircling said third ring and supporting the whole instrument and having on a portion of its inner circumference an hour scale extending from zero hour to 6½ hours, in opposite directions, a fixed indicator extending from the center of the instrument to the zero on above mentioned hour scale, for indicating the local meridian, and another indicator, rotatably mounted, extending from the center of the instrument to beyond and cooperating with said hour scale to indicate the hour angle of the said principal navigational stars.

3. A navigation instrument consisting of; a central disk, said disk having on its circumference a graduated scale of 24 hours and subdivisions thereof, for indicating Greenwich civil time, a ring rotatably mounted and encircling a portion of said disk, but not extending to its outermost periphery and having on its circumference two graduated date scales, said scales being divided into 366 parts, 365 of which are equal, the 366th part being one-fourth the size of one of the others, one of said scales being labeled as an ordinary year and the other of said scales being labeled as a leap year, a portion of said scales being visible through an opening near the circumference of said disk for setting zero hour Greenwich civil time on the Greenwich civil date, a second ring rotatably mounted and encircling said first ring and said disk and having on its circumference a graduated scale of 24 hours and subdivisions thereof, for indicating Greenwich sidereal time, said first and second rings being semi-permanently secured together, a third ring rotatably mounted and encircling said second ring and having on its inner circumference a scale graduated into degrees extending from zero to 180 in opposite directions for indicating longitude east and west, having on a greater circumference a second scale of 24 hours and subdivisions thereof, for indicating local sidereal time, the zeros of said scales on said third ring being on the same radius, and having thereon and outside of said local sidereal time scale the corrections to apply to the true altitude of Polaris to obtain the observer's latitude, the placing of said corrections being disposed according to the local sidereal time as measured on the local sidereal time scale.

4. A navigation instrument consisting of; a central disk, said disk having on its circumference a graduated scale of 24 hours and subdivisions thereof for indicating standard zone time, a ring rotatably mounted and encircling said disk and having on its circumference a graduated scale of 24 hours and subdivisions thereof for indicating the equation of time, a second ring rotatably mounted and encircling said first ring and having on its inner circumference a scale graduated in degrees, from zero to 180 degrees in opposite directions for indicating longitude east and west of a standard meridian and having thereon on a second scale on a greater circumference a scale of 24 hours and subdivisions thereof, for indicating local apparent time, the zeros of said scales on said second ring being on the same radius, and an indicator rotatably mounted on the center of said instrument and extending beyond the outer scale, for setting on the Greenwich civil time of an observation and indicating the corresponding local apparent time.

5. A navigation instrument consisting of; a central disk, said disk having on its circumference a graduated scale of 24 hours and subdivisions thereof, for indicating Greenwich civil time, and having listed inside of said scale on said disk the principal navigational stars with their mean declination, a ring rotatably mounted and encircling a portion of said disk but not extending to its outermost periphery and having on its circumference two graduated date scales, said scales being divided into 366 parts, of which 365 are equal, the 366th part being one-fourth the size of one of the others, one of said scales being dated as an ordinary year and the other of said scales being dated as a leap year, a portion of said scales being visible through an opening near the circumference of said disk, for setting zero hour Greenwich civil time on the Greenwich civil date, a second ring rotatably mounted and encircling said first ring and said disk and having on its circumference a graduated scale of 24 hours and subdivisions thereof, for indicating Greenwich sidereal time, said first and second rings being semi-permanently secured together, a third ring rotatably mounted and encircling said second ring and having on its inner circumference a scale graduated into degrees, from zero to 180 in opposite directions, for indicating longitude east and west and having on a greater circumference a second scale of 24 hours and subdivisions thereof, for indicating local sidereal time, the zeros of said scales on said third ring being on the same radius, and having plotted between the above mentioned two scales on said third ring the principal navigational stars according to their respective right ascensions as measured on the local sidereal time scale, a frame rotatably mounted and encircling said third ring and supporting the whole instrument and having on a portion of its inner circumference an hour scale, from zero to 6½ hours in opposite directions, a fixed indicator extending from the center of the instrument to the zero of above mentioned hour scale, for indicating the local meridian, and another indicator, rotatably mounted, extending from the center of the instrument beyond said hour scale for indicating the hour angle of the principal navigational stars, which together with said mean declinations on said disk are used in calculating approximate altitudes and azimuths and thereby identifying stars.

In witness whereof I have hereunto set my hand this 27th day of February, 1931.

ERLING C. IVERSON.